United States Patent [19]

Woodell

[11] Patent Number: 4,890,088
[45] Date of Patent: Dec. 26, 1989

[54] ENGINE MONITORING AND CONTROL APPARATUS

[76] Inventor: Arthur Woodell, P.O. Box 1092, Sandpoint, Id. 83864

[21] Appl. No.: 155,757

[22] Filed: Feb. 16, 1988

[51] Int. Cl.⁴ ............................................. B60Q 1/00
[52] U.S. Cl. .................................... 340/459; 340/461
[58] Field of Search ............... 340/52 F, 53, 753, 754, 340/782, 701, 815.1; 123/198 DC

[56] References Cited

U.S. PATENT DOCUMENTS

| | | |
|---|---|---|
| 3,636,509 | 1/1972 | Breece . |
| 3,792,445 | 2/1974 | Bucks et al. . |
| 3,946,364 | 3/1976 | Codomo et al. . |
| 3,963,891 | 6/1976 | De Magondeaux . |
| 4,034,335 | 7/1977 | Harazoe et al. ............... 340/52 F |
| 4,034,336 | 7/1977 | Arai ............................... 340/52 F |
| 4,053,868 | 10/1977 | Cox et al. ...................... 340/52 F |
| 4,136,329 | 1/1979 | Trobert ......................... 340/52 F |
| 4,293,843 | 10/1981 | Bertoloni et al. .............. 340/52 F |
| 4,447,801 | 5/1984 | Masuda . |
| 4,483,180 | 11/1984 | Ohbuchi et al. . |
| 4,485,772 | 12/1984 | Uchida et al. . |
| 4,604,700 | 8/1986 | Igarashi et al. . |
| 4,754,202 | 6/1988 | Havel ............................ 340/782 X |

FOREIGN PATENT DOCUMENTS

| | | | |
|---|---|---|---|
| 3500899 | 7/1986 | Fed. Rep. of Germany .... | 340/52 F |
| 2059654 | 4/1981 | United Kingdom .............. | 340/52 F |

*Primary Examiner*—Joseph A. Orsino
*Assistant Examiner*—Brian R. Tumm
*Attorney, Agent, or Firm*—Keith S. Bergman

[57] ABSTRACT

A mechanism for monitoring multiple engine and driveline conditions wherein annunciators are associated with a selectively engageable engine kill means. Illuminated light emitting diode (LED) gauges are arrayed to visually indicate various engine and other driveline conditions. Audio signal generating apparatus is selectively operative by a switching means to provide an audio signal responsive to an alert condition indicated by one or more of the visual display gauges. A flashing light also indicates a danger or alert condition indicated by the LED gauges. Complementing the audio and visual monitoring apparatus is an engine kill device that upon activation and after a preset delay will cut off power to the engine to limit potential engine damage.

2 Claims, 2 Drawing Sheets

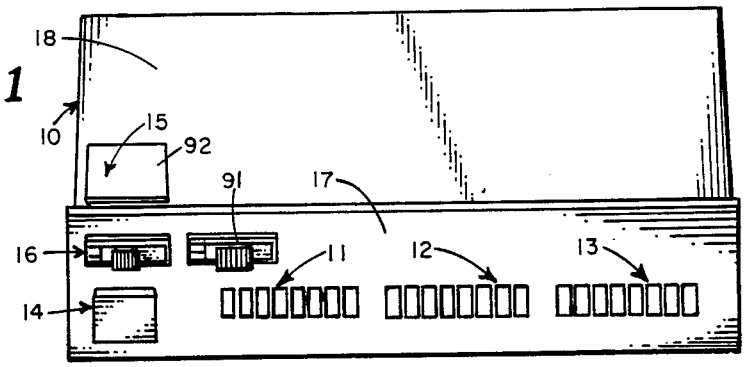
FIG. 1
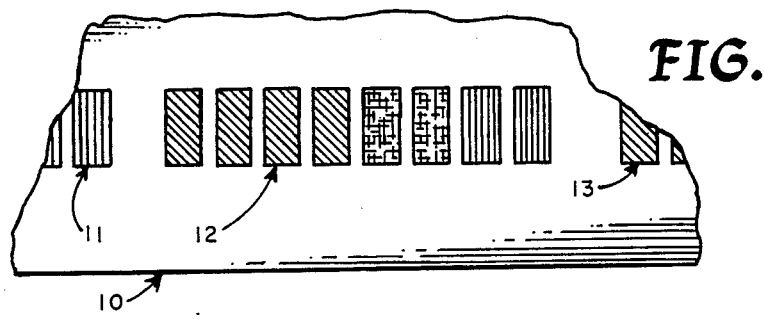
FIG. 2
FIG. 3
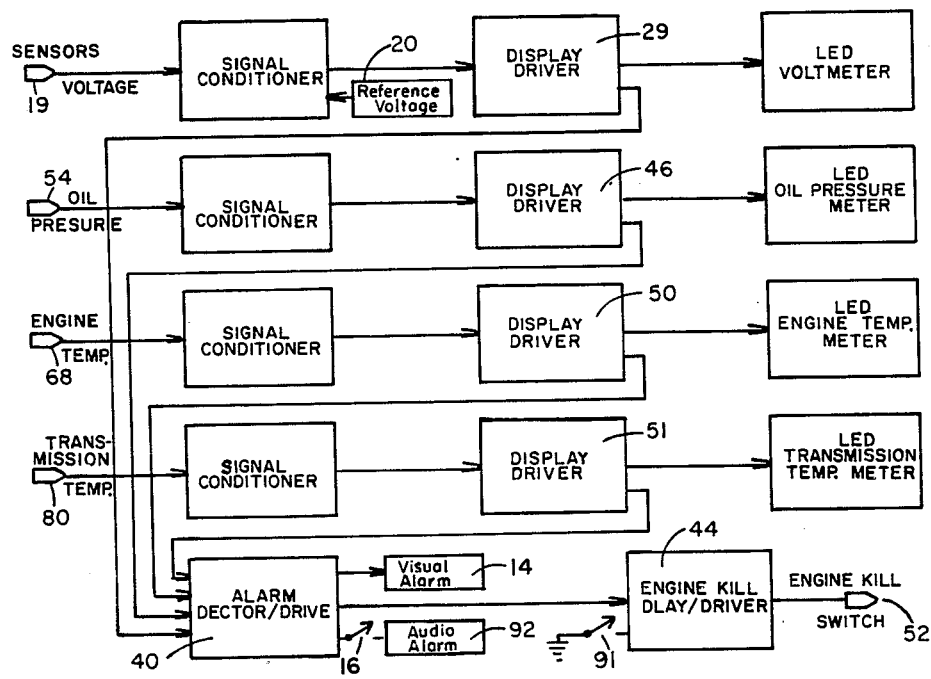

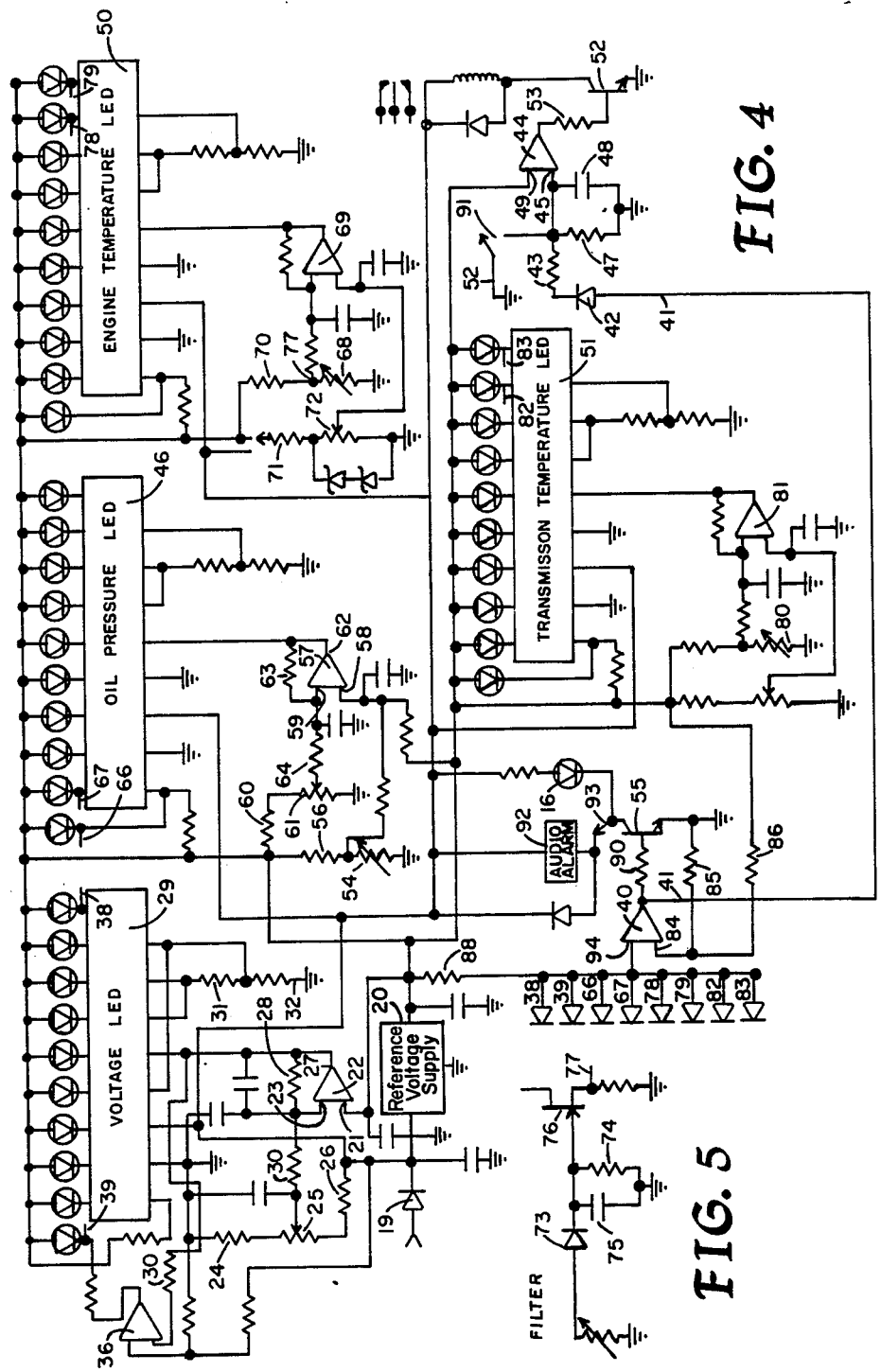

ENGINE MONITORING AND CONTROL APPARATUS

BACKGROUND OF INVENTION

A. Related Applications

There are no applications for patent relating hereto hertofore filed in this or any foreign country.

B. Field of Invention

My invention relates generally to vehicle condition monitoring apparatus and paricularly such apparatus that provides visual indication of engine condition with associated audio and visual alarm means and an engine kill means.

C. Background and Description of the Prior Art

Monitoring apparatus to provide information pertaining to a motor vehicle's various engine and driveline operational characteristics is known in the prior art. Included in this category of apparatus are monitoring devices that provide condition indicators of oil pressure, electrical charging status, water temperature, and even transmission and differential fluid temperature. Such monitoring activity is generally accepted as useful to minimize driveline component damage in motor vehicle operation by alerting an operator to the various conditions of such components during use. Monitoring devices of the past have included various means to alert an operator to unsafe driveline conditions, but driving obligations requiring alertness to highway conditions tend to minimize time available for detailed attention to monitoring devices per se. Accordingly an unsafe condition arising in a motor vehicle driveline may not be detected, and if undetected may result in serious economic loss as well as creating a hazardous driving condition.

Various means have been utilized in prior art devices in an effort to alert an operator to an unsafe vehicle component condition and to this end, devices such as kill switches and illuminated signals have been utilized. Unfortunately, devices of the past have failed to fully address the problem in contemporary driving situations to relay information and alert a driver to necessary monitoring information because of driving obligations, thereby, partially at least, failing to fulfill their intended purposes.

My invention, in an effort to overcome such shortcomings of prior art devices, provides a coordinated warning system having various warning components to alert various of an operator senses to an unsafe condition and thereby providing an operator's necessary time to take adequate steps to deal with driveline problems as may occur. Further included in the monitoring system of the instant invention is an engine kill device that will, after an appropriate time delay, deactivate or shut off a vehicle's engine to minimize damage that might occur due to an engine's continued operation in the presence of an alert condition.

A monitoring console is set forth that may be positioned within a vehicle's dashboard, or as a separate attachable unit securable relative to a dashboard, including engine temperature, oil pressure and charging system indicators. Additional monitoring gauges may be incorporated as desired to provide other information, for example, transmissin fluid temperature and differential fluid temperature. Gauges utilized by my apparatus are formed as a matrix of light emitting diodes (LED) controlled by electronic digital display circuitry which accepts analog information from monitored engine components and converts this information for digital LED display. Typically, a color code system is utilized that varies from green through yellow to red to present indication of condition, be it safe, warning or danger, respectively. This colored graphical display of information is of an easily readable and immediately comprehensible nature to be readily cognizable and interpretable by an operator of a motor vehicle.

Included in the monitoring console is switchable audio means, in the form of a loud speaker, associated with my sensing apparatus that upon occurrence of an unsafe monitored condition emits an audible signal to alert a vehicle operator to the condition. Coordinated therewith is a visual signaler in the form of a flashing illuminated light member, apart from the illuminated LED units, to provide further visual indication of an improper vehicle component condition.

In addition to the above warning elements, the instant invention incorporates an engine kill means, operatively interrelated to the warning annunciators, as a total engine protection package. The engine kill means of my invention operates after an appropriate time delay responsive to an improper operating condition being sensed and indicated. The engine will be shut down to limit damage by its continued operation.

My apparatus thusly provides an interrelated package of a monitoring and display means coordinated with an engine kill device and associated audio and visual warning components. The invention resides not in any one of these structures or features per se, but rather in the synergistic combination of all of them as herein disclosed and claimed to provide the functions that necessarily flow therefrom.

SUMMARY OF THE INVENTION

An automotive component condition monitoring system is provided, including a series of gauges comprised of light emitting diode (LED) display elements to visually indicate status, derived from analog sensors, of various automotive components -typically including engine temperature, oil pressure, and electrical charging status. Operatively coordinated therewith is an audio alert speaker that is actuated by an unacceptable monitored condition indicated by the gauge units. The audio component of the monitoring system is switchable to provide selective optional operation. A flashing light indicator, actuable in the same manner as the audio speaker, is provided to further indicate an inappropriate operating condition. An engine kill device operates responsive to alarm annunciation to shut down engine operation after a pre-selected time delay should unacceptable or undesirable conditions persist.

In creating such a device, it is:

A principal object of my invention to provide an automotive component monitoring system to utilize a plurality of visual indicators and associated visual and audio warning devices to alert an operator of an unacceptable operating condition arising from automotive components being monitored.

A further object of my invention to provide such a monitoring apparatus graphically displaying various operating conditions in an automotive environment in a colored graphical fashion for immediate observation and cognition.

Another object of my invention to provide such an automotive component monitoring system that coordinates audible warning signals with and in addition to the graphical displays of component operating conditions.

A further object of my invention to coordinate an engine kill device with the component monitoring means to shut off an engine, after an appropriate time delay, to limit engine damage as a result of a persisting undesirable monitored condition.

A still further object of my invention to provide an automotive monitoring system that is readily mountable and positionable within an automotive operating environment as a part thereof or an addition thereto.

A still further object of my invention to provide such a device that is of new and novel design, of rugged and durable nature, of simple and economical manufacture and one that is otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only practical and preferred embodiment being illustrated in the accompanying drawings as is required.

BRIEF DESCRIPTION OF DRAWINGS

FIG. 1 is an isometric view of the present invention illustrating its various parts, their configuration, and relationship.

FIG. 2 is an enlarged orthographic view, taken in elevation from the front, of a typical LED display gauge.

FIG. 3 is a block diagram of the essential components of the electrical schematic diagram set forth in FIG. 4.

FIG. 4 is an electrical schematic diagram, in normal symbology, showing the various electrical components of my invention and their operation.

FIG. 5 is an electrical schematic illustration, in normal symbology, showing an optional temperature sensor filter.

DESCRIPTION OF THE PREFERRED EMBODIMENT

My invention comprises generally vehicle instrumentation apparatus 10 providing graphical indication of operating conditions of various monitored automotive components including audio and visual alarms to indicate danger levels occuring in one or more of the various automotive components. An engine kill means is operatively associated with the monitoring apparatus to discontinue engine operation in the presence of a persistent undesirable monitored condition.

My vehicle instrumentation apparatus 10 is formed with a cabinet-like housing including forward face 17 and top 18. Various automotive components monitored are displayed by a matrix-like series of gauges formed of light emitting diode (LED) units. Illustrated in FIG. 1 is a series of LED matrix gauge displays set forth as portions 11, 12 and 13 respectively to graphically illustrate, respectively, charging circuit, engine oil pressure, and engine temperature conditions. While only three matrix displays of LED gauges are illustrated, it is to be understood that the number of such displays utilized is dependent on the number of components to be monitored. Additional gauge displays may be employed to monitor other conditions, transmission temperature and drive gear differential fluid temperature for example. The LED gauge displays are color coded, by appropriate colored diodes or covers, to correlate directly to predetermined parameters of component operating conditions. Colors typically utilized are coventional green indicating a safe operating mode, yellow for a warning condition to indicate possible required attention, and red indicating a danger condition. The details and operation of the circuitry is set forth in further detail hereinafter.

While eight light emitting diodes forming individual indicator elements are illustrated for each matrix defining a gauge, it is to be understood that this number is for illustrative purposes only and a larger or lesser number of such elements may be employed, depending on the degree of gradation desired. The green, yellow, and red scales may be equally divided among the number of elements chosen gradations may be used between these principal colors. It is, however, frequently desirable to utilize an expanded green scale for indication of a broader safe operating range and narrow yellow and red indicating portions to display a narrower danger or alert zone. Furthermore, all LED diode indicator bar displays are designed to overlap in coloration to a predetermined extent to thereby prevent a loss of indication should a particular component reading fall between sections of the discrete LED elements. Accordingly indication of component condition would therefore be visually displayed at all times during the instant invention's use. It is to be understood that the spectrum of colors utilized, green to yellow to red, provides immediate understanding to an observer of component condition without requiring undue concentration or interpretation by the observer.

In electrical communication with the LED display and associated display driver circuitry is an additional visual danger alarm indicator 14. When any of the active gauges 11, 12 or 13 indicate a danger mode by illumination of red by those discrete LED elements, danger alarm indicator 14 will be activated by appropriate circuitry associated with the danger mode indicating LED positions. Alarm indicator 14 defines a somewhat enlarged visual flashing signal to visually alert a user of a danger condition.

Further incorporated in my vehicle instrumentation apparatus 10 is an audio alarm 15 that, in concert with danger visual alarm indicator 14, will provide a noticeable, if not somewhat irritating, accessory alarm arrangement to attract attention to an alert condition. As it is not always desirable and may become unnecessarily distracting to maintain an audio alarm after an operator is alerted, and is taking steps to correct a problem condition, an audio switch 16 is provided on forward face 17 to deactivate audio alarm indicator 15 by manually repositioning switch 16 to an "off" mode. Alternatively, a time delay may be utilized to disengage audio alarm 15.

The LED display gauges include a voltage meter scale 11 to generate a danger or red signal when extreme voltage levels are present in the charging system. The volt meter scale generally ranges from about 11.5 volts to about 16.5 volts to encompass the variance normally encountered in a conventional 12 volt automotive system, but as may be understood, other ranges may be used dependent on the needs or voltage levels of a system in qustion. For example, 6 volt systems are presently utilized in limited numbers of vehicles such as in older or commercial-type vehicles. Furthermore, 24 volt systems may be utilized in certain vehicles. The voltage scale will indicate a red or danger condition at a lower extreme to indicate a lack by charging of an associated charging system and will also generate a danger or red signal at the upper extreme to indicate overcharging. Overcharging tends to ruin a battery in a charging system, whereas undercharging tends to limit the electrical system's effectiveness and either may indicate defects in the system. The yellow portion of the volt meter scale will be lighted, in a 12 volt system, when the charging falls within the 12.0 to 12.6 voltage range, which will denote a general lack of charging in a conventional 12 volt system. The acceptable green area will be lighted in approximately the 13.1 to 16.0 volt range.

Oil pressure indicator 12 is generally a linear pressure indicating gauge ranging from approximately 0 to 55 psi oil pressure levels. Since a problem or red pressure indication level is normally critical only at the lower end of the scale, the gauge will indicate red in a 0 to 10 psi condition will indicate yellow in a 15 to 20 psi condition, and will indicate green at 25 psi and above. These parameters may be modified according to particular need, but will suffice for the majority of contemporary engines.

Engine temperature indicator 13 is of an expanded scale type indicating linearly from approximately 150 degrees F. to 250 degrees F. Green illumination by the LED elements will indicate engine temperatures up to 200 degrees F., with yellow indicating temperatures from approximately 210 to 230 degrees F., and red indicating temperatures above approximately 240 degrees F. where such overheating will indicate a problem condition.

The transmission indicator gauge illustrated schematically in FIGS. 3 and 4, if used, is substantially similar in operation to the engine temperature gauge and would differ only in the temperature ranges monitored.

FIG. 3 sets forth a simplified represenation of the various sensors 19, 54, 68, and 80 presenting analog signals to respective "signal conditioner" circuitry to convert the analog signals to usable form. Respective display drivers 29, 46, 50, and 51 drive the respective LED matrix gauge bar displays. Threshold signal impulses, determined by alert conditions in the various monitored automotive components, activate driver 40 to actuate the various visual and audio alarms 14 and 92 along with selective actuation of engine kill driver 44 optionally actuatable via switch 91.

Attention is directed to FIG. 3 showing a diagrammatic representation of electronic circuitry employed for control and operation of the various gauges utilized. Included therewith is a transmission temperature display gauge; although such a gauge is not shown in FIG. 1, it may be added thereto as desired.

The various gauges of my apparatus operate as follows and as particularly illustrated in FIG. 4.

Voltmeter: The monitored system voltage, which simultaneously provides the operating voltage required by the panel, enters the panel via diode 19, that provides protection against erroneous hookup. A reference voltage source 20 provides input voltage to pin 21 of differential amplifier 22. The monitored system voltage input communicates through divider circuit including resistors 24, 25, and 26 to the other input pin connection 23 of amplifier 22. The output of amplifier 22 is produced as an error voltage at amplifier pin 27, the voltage being proportional to the difference between the input voltages at pins 21 and 23 modified by the ratio of resistors 30 and 28. The output voltage of amplifier 22 is then connected to the input of voltmeter LED driver 29. Driver 29 is formed into an expanded scale meter by connecting the bottom of the driver's reference supply to the junction of voltage divider formed by resistors 31 and 32, as illustrated. Furthermore, since the LED drivers 29, 46, 50 and 51 utilized may be limited to a reference measurement at only one end of the measurement range, and in the voltmeter configuration at a relatively low voltage end, an additional differential amplifier 36 is positioned in the circuit as a voltage comparator. The output of amplifier 36 remains at a relatively "high", or "off" level, unless the monitored system voltage goes higher than the last green LED of driver 29, at pin 27. Above that level, amplifier 36 switches on, lighting the top red LED. Alarm signals are electrically referenced to junction points 38 and 39 when the monitored system voltage attains either high or low voltage preset limits.

Engine kill: Engine kill switch 91 is normally positioned, as illustrated in FIG. 4, to an "on" mode as opposed to optional grounding of the engine kill circuitry to deactivate the engine kill portion of the invention. Whenever amplifier or alarm driver 40 is activated, the alarm signal is relayed from junction 41 via diode 42 and resistor 43 to the differential engine kill driver 44 input at pin 45. Values selected for resistors 43 and 47 and capacitor 48 establish on/off time constants for the engine kill feature which is nominally preset at 30 seconds. The other input to amplifier driver 44 at pin 49, is connected to the output of the reference supply. Amplifier driver 44 is utilized in the circuit as a comparator, and is not normally activated, or alternatively it is of a sufficiently low output, until an alarm signal presented through junction 41 is present long enough to activate it. When amplifier driver 44 does turn on (or to a relatively high output), switch 52 is activated via resistor 53, to in turn activate the engine kill relay. Conventional type contacts such as "C" form contacts, are utilized to handle switching requirements.

Oil pressure meter: Oil pressure sensor 54 provides electrical resistance proportional to monitored oil pressure. The oil pressure sensor is of analog output and connected to a main oil pressure line in a monitored system, such as in an automobile engine. A reference voltage, provided through reference voltage supply 20, is connected through resistor 56 such that resistance related to the aforenoted oil pressure sensor will change with a monitored pressure differential as the voltage at the junction of resistor 56 and the sensor 54 changes. This variable voltage output is connected to differential amplifier 57 at pin 58. The other input at pin 59 is determined by values of a voltage divider including resistances 60 and 61. An output voltage is produced by amplifier 57 at pin 62 which is proportional to the difference between the voltage inputs at pins 58 and 59 proportioned to the ratio of the resistance of resistors 63 and 64. The output voltage, at pin 62 of amplifier 57, is connected to the input of LED oil pressure driver 46. The driver 46 is formed with a fixed value as an upper limit, such as 50 psi for example, to provide acceptable graphic resolution of the LED display matrix at lower oil pressure levels. Alarm signals are generated through points 66 and 67 when oil pressure falls to a preset critical level.

Two variations may occur in use of my invention: firstly, in an application where my invention is the only monitoring system, as might occur when my invention is utilized to replace "idiot" type lights in an OEM system or, secondly, where my invention is utilized as an auxiliary monitoring system working in conjunction with a pre-existing gauge monitor and temperature sensor 68 associated with amplifier 69. The instant invention is compatible in both instances. A further variation exists where an existing engine temperature sensor is powered by the monitored system. In this case, resistor 70 is omitted, resistor 71 is connected to the monitored system voltage, and where the existing gauges have a regulated voltage supplied to them, two Zener diodes are connected across resistor 72 for stability.

An additional variation is required for constructions used by some manufacturers wherein the engine temperature monitoring system utilizes a pulsed voltage supply to drive the system's gauges. This variation may be accommodated by severely dampening the original pulses and thusly avoiding indication of the pulses. However, response times in this type of modified system are extended so that monitoring gauges may not adequately provide needed protection. For these applications, a peak detector and filter arrangement, an example of which is illustrated in FIG. 5, includes a diode 73, resistor 74 and capacitor 75 and field effect switch 76, positioned between the temperature sensor and resistor connection 77 to eliminate the voltage pulses while maintaining a shorter response time than the original system. Alarm signals are derived at points 78 and 79 of the LED display matrix.

Transmission temperature meter: A temperature sensor 80, whose resistance is again proportional to temperature as in the engine temperature sensor, is connected to a transmission output coolant line leading to the transmission radiator or to any source of heated fluid such as in the transmission pan itself. Circuit operation is essentially the same as the oil pressure meter with utilization of differential amplifier 81 and LED driver 51. Alarm signals are derived at points 82 and 83 when the temperature gets too high.

Alarms: Whenever any alarm signals are present at danger signal points 38, 39, 66, 67, 78, 79 and 82, 83, a connection to differential amplifier 40 is generated, which is itself utilized in the circuit as a comparator. A reference level is established at pin 84, one input of amplifier driver 40, by divider resistors 85 and 86. Pin 94, the other input of amplifier driver 40, is biased by resistor 88 such that output of amplifier 40 is not activated, or is of a sufficiently low value, unless an alarm signal is present. When an alarm signal occurs at pin 94, the output of amplifier 40 attains a sufficiently high level such that switch 55 switches on via resistor 90. When switch 55 switches on, visual alarm 14 lights, and if the audio alarm enabling switch 93 is on, the audio alarm 92 is also activated.

The foregoing description of my invention is necessarily of a detailed nature so that a specific embodiment might be set forth as required, but it is to be understood that various modifications of detail, rearrangement and multiplication of parts might be resorted to without departing from its spirit, essence or scope.

Having thusly described my invention, what I desire to protect by Letters Patent, and what I claim is:

1. A vehicle component monitoring and alarm system to indicate individual vehicle component condition comprising in combination:
    gauge means having a display for continuously visually indicating monitored conditions of vehicle components, said gauge means including analog sensors responsive to said vehicle components' condition and analog to digital converter circuitry to relay a digital signal for visual indication of said component condition and said display comprising a plurality of bars, each bar formed of plural spaced color coded light emitting diodes and associated with each monitored vehicle component, and
    alarm means operatively associated with said gauge means for actuation when said gauge means receive and relay to said alarm means a signal caused by an undesirable monitored condition of an automotive component so monitored, said alarm means including a visual alarm and an audio alarm having switching means electrically associating said audio alarm to said gauge means for selective operation of said audio alarm.

2. A vehicle component monitoring and alarm system as set forth in claim 1 further including an engine kill means operatively associated with said gauge means,
    said engine kill means including switching means to discontinue ignition current to a vehicle engine when said engine kill means is activated by an undesirable condition monitored by said gauge means and relayed to said engine kill means.

* * * * *